(12) United States Patent
Hanada et al.

(10) Patent No.: US 7,501,913 B2
(45) Date of Patent: Mar. 10, 2009

(54) POWER LINE COMMUNICATION APPARATUS AND CONNECTING DEVICE

(75) Inventors: Tsunehiro Hanada, Fukuoka (JP); Akihiro Yamashita, Saga (JP); Yuji Igata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 11/675,141

(22) Filed: Feb. 15, 2007

(65) Prior Publication Data

US 2007/0190840 A1 Aug. 16, 2007

(30) Foreign Application Priority Data

Feb. 15, 2006 (JP) .............................. 2006-038319

(51) Int. Cl.
*H03H 7/46* (2006.01)

(52) U.S. Cl. ...................................... 333/132; 375/259

(58) Field of Classification Search ................. 333/132; 340/310.01, 310.07, 310.08; 375/259; 307/40
See application file for complete search history.

(56) References Cited

U.S. PATENT DOCUMENTS

| | | | |
|---|---|---|---|
| 6,445,087 B1 * | 9/2002 | Wang et al. ................... | 307/40 |
| 6,741,152 B1 | 5/2004 | Arz | |
| 6,956,464 B2 | 10/2005 | Wang et al. | |
| 2006/0227884 A1 * | 10/2006 | Koga et al. .................. | 375/257 |
| 2007/0120953 A1 * | 5/2007 | Koga et al. ................ | 348/14.01 |

FOREIGN PATENT DOCUMENTS

JP 08032495 2/1996

OTHER PUBLICATIONS

English translation of JPH08-032495A.

* cited by examiner

*Primary Examiner*—Daniel D Chang
(74) *Attorney, Agent, or Firm*—Dickinson Wright, PLLC (57) ABSTRACT

A cable connecting device for power line communication includes: a first wiring line 231 and a second wiring line 232 through which AC power is capable of being supplied; a power plug 120 which is electrically connected to the first wiring line 231 and the second wiring line 232 and whose wiring lines are capable of being supplied with AC power; an Ethernet port 110 through which a communication signal is capable of being input and output; a power line communication modem 220 that is connected to the Ethernet port 110 and that is connected to the second wiring line 232 through which a communication signal is transmitted by using AC power input to the power plug 120 through the first wiring line 231 between the power plug 120 and the Ethernet port 110; a filter 210 disposed on the first wiring line 231 and having high impedance in at least a frequency band used for power line communication rather than a frequency band used for AC power; and connectors 101 to 104 which axe electrically connected to the first wiring line 231 between the filter 210 and the power line communication modem 220 and to which AC power from the first wiring line 231 is capable of being supplied.

18 Claims, 7 Drawing Sheets

POWER LINE COMMUNICATION APPARATUS AND CONNECTING DEVICE

BACKGROUND

The present invention relates to a power line communication apparatus and a connecting device used in power line communication.

In known power line communication using the spread spectrum communication technology disclosed in, for example, JP-A-8-32495, there is used a cable connecting device for power line communication having a spread spectrum communication circuit, which includes a modulation unit and a power connector for connecting a non-power line communication apparatus that does not perform power line communication. Further, a power strip provided with a plurality of outlets is disclosed U.S. Pat. No. 6,956,464B2.

However, in the cable connecting device for power line communication or the power strip, a power filter for modem is required in addition to a power filter for connector. Accordingly, there has been a problem in which the filters are separately provided.

SUMMARY

The invention has been finalized in view of the drawbacks inherent in the related art. In the invention, since a power supply circuit and a second connector are connected to a first connector through the same filter, the filter can have both a function as a filter for the power supply circuit and a function as a filter for electrical equipment connected to the second connector. As a result, it is not necessary to separately prepare a filter for a power supply circuit and a filter for electrical equipment connected to the second connector. Thus, it is an object of the invention to provide a power line communication apparatus and a connecting device capable of efficiently using a filter.

In order to achieve the above object, according to an aspect of the invention, a power line communication apparatus that superimposes a signal having a first frequency on power having a second frequency lower than the first frequency includes: a first connector to which the power is input; a communication circuit that superimposes the signal on the power input to the first connector; a power supply circuit that supplies the power input to the first connector to the communication circuit; a second connector that outputs the power input to the first connector to the outside of the power line communication apparatus; and a single filter that has impedance characteristics in which impedance corresponding to the first frequency is higher than impedance corresponding to the second frequency, wherein the first connector is connected to the power supply circuit through the single filter, and the first connector is connected to the second connector through the single filter, In the configuration described above, since the power supply circuit and the second connector are connected to the first connector through a single filter, the filter can have both a function as a filter for the power supply circuit and a function as a filter for electrical equipment connected to the second connector. Accordingly, since a filter can be efficiently used, duplication of filters can be prevented.

Further, in order to achieve the object, according to another aspect of the invention, a connecting device for a power line communication apparatus that superimposes a signal having a first frequency on power having a second frequency lower than the first frequency includes: a first connector to which the power is input; a power supply circuit that supplies the power input to the first connector to a communication circuit that superimposes the signal on the power; a second connector that outputs the power input to the first connector to the outside of the power line communication apparatus; and a single filter that has impedance characteristics in which impedance corresponding to the first frequency is higher than impedance corresponding to the second frequency, wherein the first connector is connected to the power supply circuit through the single filter, and the first connector is connected to the second connector through the single filter.

In the configuration described above, since the power supply circuit and the second connector are connected to the first connector through a single filter, the filter can have both a function as a filter for the power supply circuit and a function as a filter for electrical equipment connected to the second connector. Accordingly, since a filter can be efficiently used, duplication of filters can be prevented.

DETAILED DESCRIPTION

Hereinafter, a power line communication apparatus and a connecting device according to embodiments of the invention will be described with reference to accompanying drawings.

First Embodiment

First, a cable connecting device for power line communication according to an embodiment of the invention will be schematically described.

Figure 1:
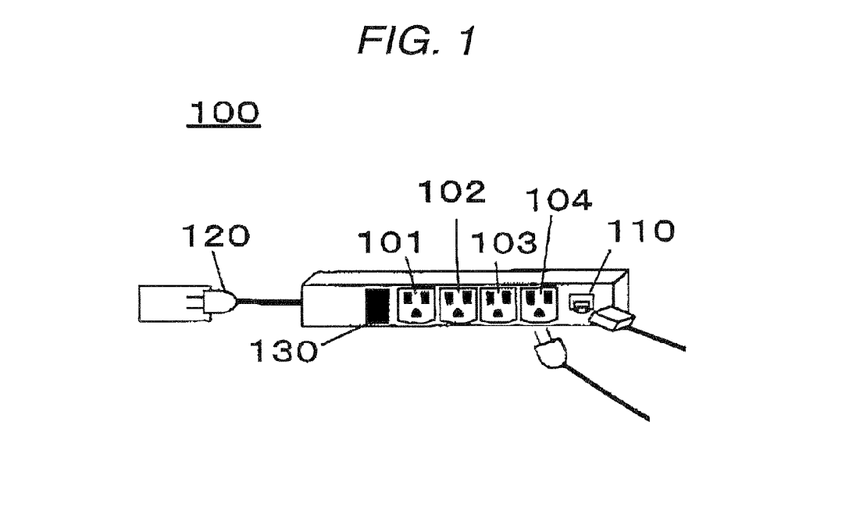
FIG. 1 is a view schematically illustrating a cable connecting device for power line communication in a first embodiment.

As shown in FIG. 1, a cable connecting device for power line communication 100 has connectors 101, 102, 103, and 104, an Ethernet (Registered Trademark) port 110 to which an Ethernet cable is connectable, a power plug 120, and a selection switch 130. Here, the connectors 101, 102, 103, and 104 are examples of a second connector. Here, only explanation related to a first embodiment will be made.

In addition, as an example of the cable connecting device for power line communication 100, an example in which the invention is applied to a power strip (in other words, surge strip) is illustrated, as shown in FIG. 1. However, the invention is not specifically limited to the power strip but may be applied to various products. It is not necessary that the cable connecting device for power line communication 100 have a power cable or a plurality of outlets like the power strip described above. For example, the cable connecting device for power line communication 100 may be an AC adaptor having a pair of plug and outlet. In addition, the invention may be applied to a modem. In this case, it is preferable that the modem have at least an outlet corresponding to one of the connectors 101, 102, 103, and 104. Moreover, the invention may be applied to electrical equipment having a communication function, such as so-called 'networking appliances'. In the case, in the same manner as the modem, it is preferable to include at least an outlet.

The connectors 101, 102, 103, and 104 are connectors for supply of power to non-power line communication apparatuses. Further, the number of connectors is not limited to four of the connectors 101, 102, 103, and 104 but may be more than four. The non-power line communication apparatus refers to electrical equipment, such as home appliances, which do not perform power line communication. Furthermore, the Ethernet port 110 is a connecting port of a cable for input and output of a communication signal. In addition, the power plug 120 is connected to a power supply source, such as a wall outlet.

In addition, the selection switch 130 will be described later because the selection switch 130 is not used in the present embodiment.

Further, the power supply source is a commercial power supply that supplies AC power having a voltage of AC 100 V and a power frequency of 60 Hz; however, it is possible to commercial voltage (for example, 120 V or 220 V) and a power frequency (for example, 50 Hz) of the AC power. Furthermore, the power plug 120 may not be necessarily provided. For example, a power plug connected with a power cord (so-called AC cable) may be externally provided and the cable connecting device for power line communication 100 may have a power plug connector, into which the externally provided power plug is inserted, provided on a forefront stage (definition of a 'front stage' will be described later) thereof. In addition, the Ethernet port 110 is an example of a communication connector through which a communication signal is capable of being input and output. For example, the Ethernet port 110 is a modular jack such as the RJ45, but is not specifically limited thereto.

Figure 2:
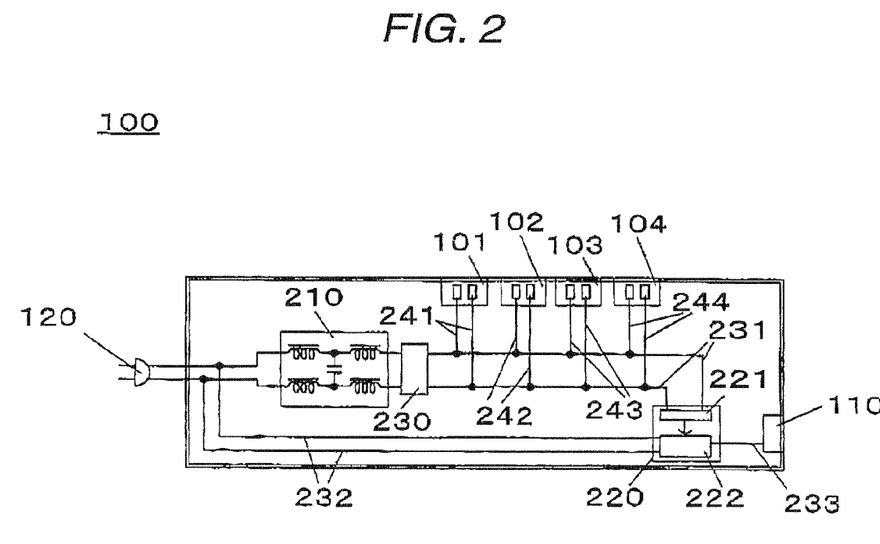
FIG. 2 is a circuit diagram illustrating the cable connecting device for power line communication in the first embodiment.

As shown in FIG. 2, in addition to the above configuration, the cable connecting device for power line communication 100 includes a filter 210, a power line communication modem 220, a surge absorber 230, a first wiring line 231, a second wiring line 232, a wiring line 233 for Ethernet port, and wiring lines 241 to 244 for connectors. In addition, the power line communication modem 220 includes a power circuit 221 and a communication circuit 222. In addition, the first wiring line 231 is an example of a first line. The first line may be configured in various ways, such as a wire or a pattern on a circuit board, as long as a power plug and a communication circuit can be electrically connected to each other. Moreover, the second wiring line 232 is an example of a second line. The second line may be configured in various ways, such as a wire or a pattern on a, circuit board, as long as a power plug and a power supply circuit can be electrically connected to each other. The power line communication modem 220 may be provided between the filter 210 and the connectors 101, 102 103, and 104.

The Ethernet port 110 is an example of a communication connector. In addition, the power plug 120 is an example of a first connector. In addition, the power line communication modem 220 is an example of a power line communication unit. In addition the first wiring line 231 is an example of a first line. In addition the second wiring line 232 is an example of a second line. In FIG. 2, the same parts as in the cable connecting device for power line communication 100 shown in FIG. 1 are denoted by the same reference numerals. The characteristics of the parts denoted by the same reference numerals are as described above.

The first wiring line 231 is a power line that serves to connect the power plug 120 and the power circuit 221 of the power line communication modem 220 to each other and transmit power supplied from the power plug 120 to the power circuit 221. Assuming that a side close to the power plug 120 is a 'front stage' and a side close to the power line communication modem 220 is a 'rear stage' on the first wiring line 231, the second wiring line 232, the filter 210, the surge absorber 230, and the wiring lines 241 to 244 for connectors are electrically connected in the order from the front stage to the rear stage on the first wiring line 231. In this case, the wiring lines 241 to 244 for connectors are electrical wiring lines that serve to connect the connectors 101 to 104 and the first wiring line 231 to each other and transmit the power supplied from the power plug 120 to the connectors 101 to 104.

The second wiring line 232 is a communication line that serves to connect the power plug 120 and the communication circuit 222 of the power line communication modem 220 to each other, transmit a communication signal, which is input to the power plug 120 from the outside (not shown), to the communication circuit 222, and transmit to the power plug 120 a communication signal transmitted through the wiring line 233 for Ethernet port. Moreover, in the present embodiment, the first wiring line 231 and the second wiring line 232 partially overlap each other at a front stage on the first wiring line 231 positioned in front of the filter 210.

The wiring line 233 for Ethernet port serves to connect the power line communication modem 220 and the Ethernet port 110 to each other, transmit to the Ethernet port 110 the communication signal transmitted through the second wiring line 232, and transmits to the communication circuit 222 a communication signal transmitted from an apparatus (not shown).

The filter 210 has impedance characteristics in which impedance corresponding to a power frequency is higher than impedance corresponding to a communication frequency As described above, the power frequency is 60 Hz. The communication frequency refers to a frequency used in power line communication and is in a range of 1.705 MHz to 80 MHz, for example. Therefore, the filter 210 has impedance characteristics in which impedance corresponding to 60 Hz is higher than impedance corresponding to 1.705 MHz to 80 MHz.

As an example of the circuit configuration of the filter 210, four inductors and a capacitor are connected as shown in FIG. 2, thereby realizing a low pass filter. That is, the low pass filter is realized by connecting in parallel two sets of inductors, each of which is obtained by connecting two inductors in series, and by connecting points between the-two inductors in the respective two sets of inductors to each other by the use of the capacitor. However, the filter 210 may be realized in a configuration other than that described above Furthermore, in the filter 210, all frequency bands other than the power frequency do not necessarily correspond to high impedance, as long as impedance corresponding to at least a communication frequency is higher than impedance corresponding to a power frequency used for commercial power.

The power circuit 221 supplies power, which is supplied from the power plug 120 through the filter 210 and the surge absorber 230 on the first wiring line 231, to the communication circuit 222. In addition, the communication circuit 222 performs signal conversion for transmitting to the second wiring line 232 a communication signal transmitted through the wiring line 233 for Ethernet port, such as signal conversion for transmitting to the wiring line 233 for Ethernet port a communication signal transmitted through the second wiring line 232.

The surge absorber 230 is an element whose impedance becomes extremely small in a high voltage. The surge absorber 230 is inserted behind the filter 210 and before the wiring lines 241 to 244 for connectors and is electrically connected to the first wiring line 231. By connecting the surge absorber 230 at the position, it is possible to prevent the surge absorber 230 from absorbing a communication signal transmitted on the second wiring line 232.

Figure 4:
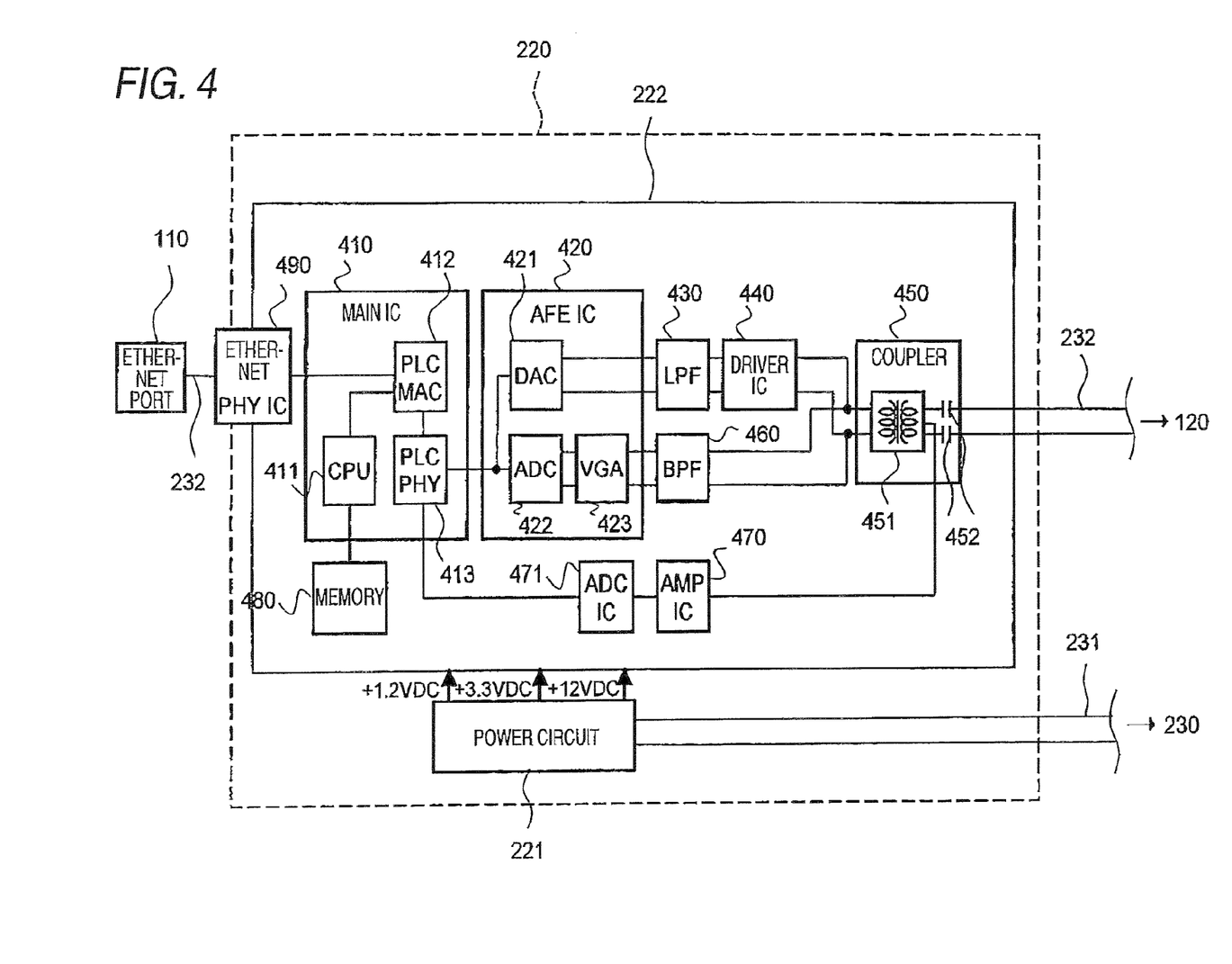
FIG. 4 is a block diagram illustrating a circuit of a power line communication modem in the first embodiment.

As shown in FIG. 4, the power line communication modem 220 includes the communication circuit 222 and the power circuit 221. The power circuit 221 has a switching regulator that makes ON/OFF control on a voltage input from a plug, converts AC components of power to DC components, and supplies, as converted power, a variety of voltages (for example, +1.2 V, +3.3 V, or +12 V) to the communication circuit 222. Specifically, the switching regulator converts AC components of the power to DC components by using a switching element. In addition, the power circuit is an example of a power supply circuit and is not specifically limited to the switching regulator as-long as power (for example, DC voltage) can be supplied to the communication circuit.

The communication circuit refers to a circuit capable of transmitting a communication signal using a modulation method, such as the OFDM (orthogonal frequency division multiplexing) method, through the second wiring line corresponding to a power line. Specifically, the communication circuit is denoted as the communication circuit 222. The communication circuit 222 includes a main IC 410, an AFE IC (analog front end IC) 420, a low pass filter 430, a driver IC 440, a coupler 450, a band pass filter 460, an AMP (AMPLI-FIER) IC 470, an ADC (AD conversion) IC 471, a memory 480, and an Ethernet PHY IC 490. The coupler 450 is connected to the second wiring line 232.

The Ethernet port (for example, RJ45) 110 is a port for connection between an Ethernet cable and a communication apparatus (not shown). The Ethernet PUY IC 490 performs signal conversion with respect to a signal for Ethernet and a signal for power line communication. The Ethernet port 110 is connected to the Ethernet PHY IC 490.

The main IC 410 has a CPU (central processing unit) 411, a PLC·MAC (power line communication·media access control layer) block 412, and a PLC·PRY (power line communication·physical layer) block 413. The CPU (central processing unit) 411 is mounted with a 32-bit RISC (reduced instruction set computer) processor. The PLC·MAC block 412 manages an MAC layer of a transmitted signal in the power line communication and serves to control the PLC·PHY block 413 or check whether or not signal data for power line communication is correct.

The PLC·PHY block 413 manages a PHY layer of a transmitted signal in the power line communication and performs processing on a transmitted signal and processing on a received signal For example, with respect to a transmitted signal when a multi-carrier communication method is used in the power line communication, the PLC·PHY block 413 performs symbol mapping by converting bit data, which is the transmitted signal, into symbol data, converts serial data into parallel data, or performs desired frequency-time transform, such as the inverse fast Fourier transform (IFFT) or the inverse discrete wavelet transform (IDWT). For example, with respect to a received signal when a multi-carrier communication method is used in the power line communication, the PLC·PHY block 413 performs symbol mapping by converting bit data, which is the transmitted signal, into symbol data, converts serial data into parallel data, or performs desired frequency-time conversion, such as the inverse fast Fourier transform (IFFT) or the inverse discrete wavelet transform (IDWT). In addition, the PLC MAC 412 is connected to the Ethernet PHY IC 490. In addition, the CPU 411 is connected to the PLC·MAC block 412. In addition, the PLC·PUY block 413 is connected to the PLC·MAC block 412. Moreover, the memory 480 is connected to the CPU 411.

The AFE IC 420 includes a D/A converter (DAC) 421, an A/D converter (ADC) 422, and a variable amplifier (VGA) 423. The D/A converter 421 is connected to the PLC·PHY block 413 and the low pass filter 430. The low pass filter 430 is connected to the driver IC 440. The D/A converter 422 is connected to the PLC·PHY block 413 and the variable amplifier 423. The VGA 423 is connected to the band pass filter 460. In addition, the D/A converter 421, the low pass filter 430, and the driver IC 440 form a transmission system that performs signal processing in which a power line communication signal is fed to the second wiring line 232. In addition) the A/D converter 422, the VGA 423, and the band pass filter 460 form a receiving system that performs signal processing in which the power line communication signal is received from the second wiring line 232.

The coupler 450 has a coil transformer 451 and a coupling capacitor 452. The coupler 450 serves to superimpose a signal from the transmission system, as a power line communication signal, on the second wiring line 232, extracts only a power line communication signal from the second wiring line 232, and outputs the power line communication signal to the receiving system. In addition, the coupler 450 is connected to the driver IC 440 and the band pass filter 460.

Further, the ADC IC 471 is connected to the PLC·PHY block 413 and the AM IC 470. Moreover, the AMP IC 470 is connected to the coupler 450.

Figure 5:
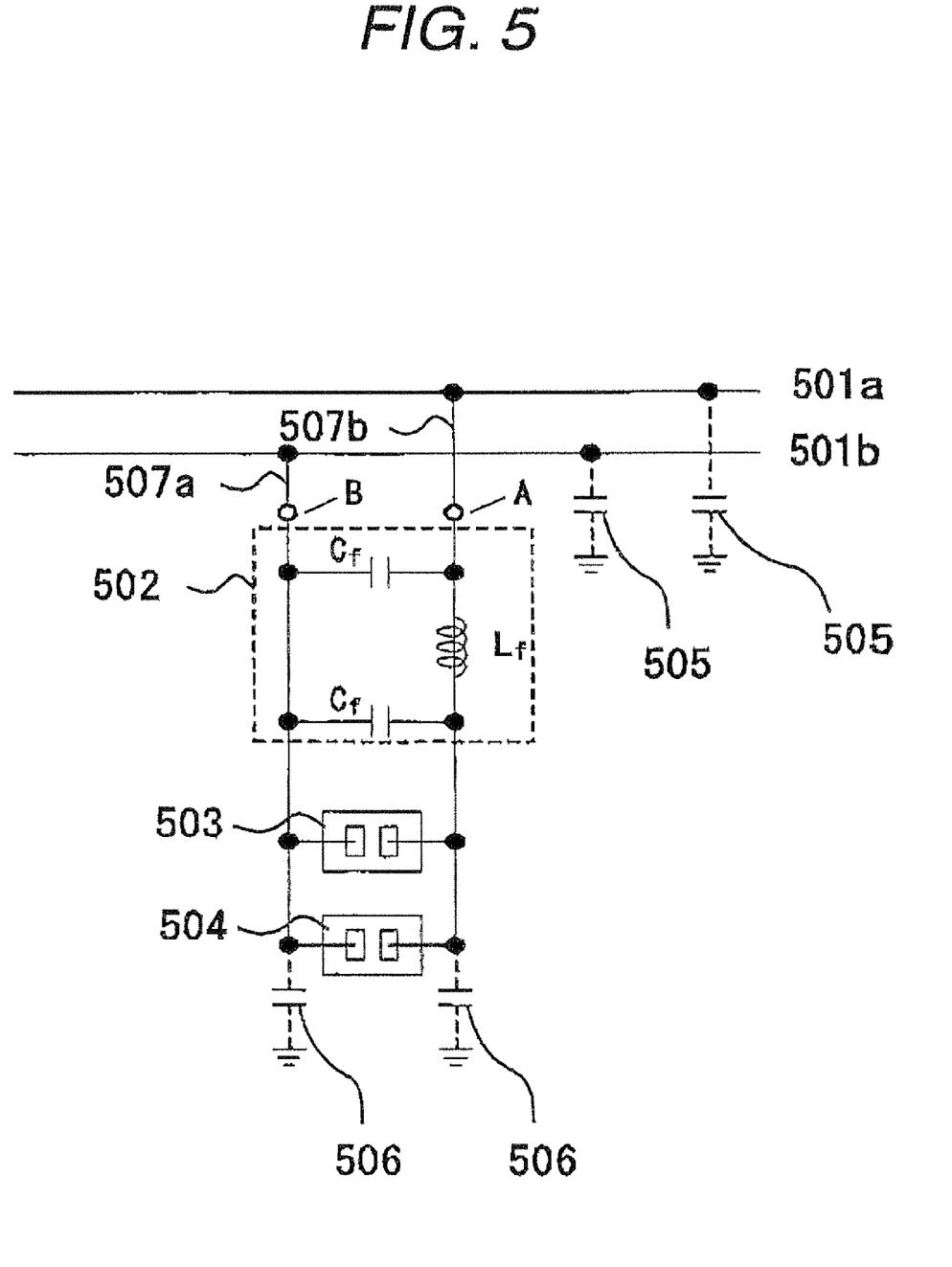
FIG. 5 is an equivalent circuit diagram when a power connector is connected to a power line in the first embodiment with a known unbalanced filter interposed therebetween.
Figure 6:
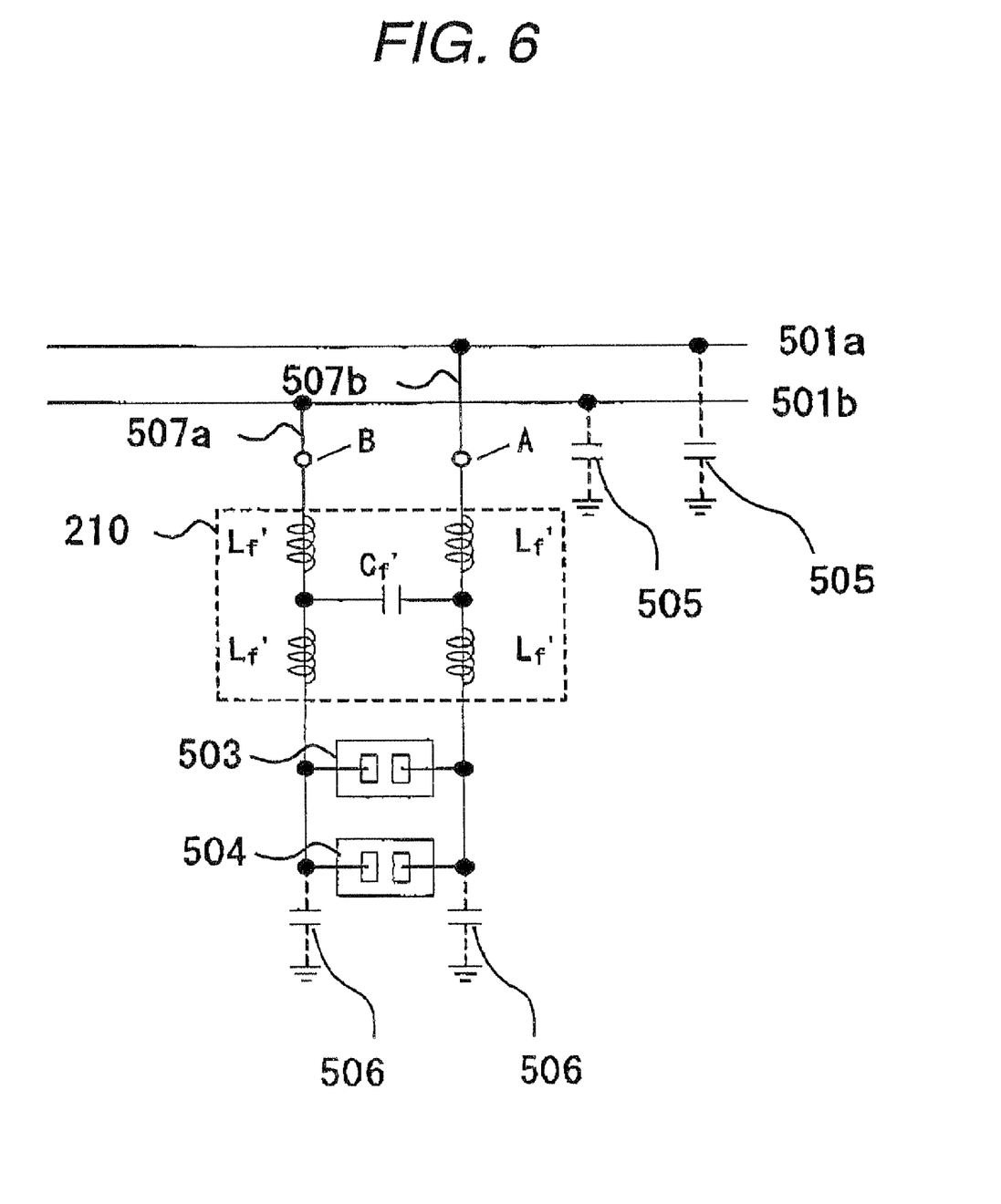
FIG. 6 is an equivalent circuit diagram when a power connector is connected to the power line in the first embodiment with a balanced filter interposed therebetween.

Here, referring to FIGS. 5 and 6, it will be described about a difference between effects of an unbalanced (asymmetrical between approach path and return path) filter 502 and a balanced (symmetrical between approach path and return path) filter 210 with respect to balancing of lines. In addition, the approach path and the return path are parallel paths through which AC power can be freely transmitted. In this case, the second wiring line 232 has a pair of approach path and return path. Referring to FIG. 5, reference numeral 505 denotes parasitic capacitance between a power line 501 and ground, and reference numeral 506 denotes parasitic capacitance between power connector lines 507a and 507b and ground. If a circuit subsequent to the unbalanced filter 502 is not connected, capacitance between wiring lines 501a and 501b, which form the power line 501, and ground is equal. Accordingly, in this case, the power line 501 is balanced. In the case in which a circuit (unbalanced filter 502 and power connectors 503 and 504) subsequent to the unbalanced filter 502 is connected, assuming that impedance seen from an A point toward the direction of the unbalanced filter 502 is Za and impedance seen from a B point toward the direction of the unbalanced filter 502 is Zb, impedance between the wiring line 501a and ground becomes parallel impedance of the power line-to-ground parasitic capacitance 505 and the impedance Za and impedance between the wiring line 501b and ground becomes parallel impedance of the power connector line-to-ground parasitic capacitance 506 and the impedance Zb. As is apparent from FIG. 5, the circuit seen from the A point is different from the circuit seen from the B point. Accordingly, the impedance Za and impedance Zb are different from each other. As a result, a difference between impedance between the wiring line 501a and ground and impedance between the wiring line 501 b and ground occurs, which lowers the balance, wherein LCL (Longitudinal Conversion Loss) increases. When power line communication is performed by using power lines whose balance is reduced, a leaking electromagnetic field increases, Next, referring to FIG. 6 again, a case in which the balanced filter 210 is used will be described. In FIG. 6, the same parts as in FIG. 5 are denoted by the same reference numerals. The characteristics of the parts denoted by the same reference numerals are as described above.

The balanced filter 210 has a capacitor Cf, as shown in FIG. 6. Two inductors Lf are connected to both ends of the capacitor Cf, respectively. The two inductors Lf have equal characteristic values (unit: Heny). In addition, values of the two inductors Lf may be substantially equal to an extent that the balance can be suppressed. The balanced filter 210 has four inductors Lf. One of the inductors Lf connected to one end of the capacitor Cf is connected to the wiring line 501a. One of the inductors Lf connected to the other end of the capacitor Cf is connected to the wiring line 501b. In addition, one of the inductors Lf connected to the one end of the capacitor Cf is connected to one ends of the power connectors 503 and 504 and power connector line-to-ground parasitic capacitance 506. The rest one of the inductors Lf connected to the other end of the capacitor Cf is connected to the other ends of the power connectors 503 and 504 and power connector line-to-ground parasitic capacitance 506. That is, in the balanced filter 210, both ends of the capacitor Cf are connected to the wiring lines 501a and 501b through the inductors Lf, respectively. Thus, a filter having the inductors Lf provided at a line in which a signal is input from the wiring lines 501a and 501b to the balanced filter 210 is called an inductance input type filter. The inductors Lf is an example of a passive element and has a predetermined characteristic value As described above in FIG. 5, the power line 501 is a balanced line if the balanced filter 210 is not connected. In the case in which a circuit (balanced filter 210 and power connectors 503 and 504) subsequent to the balanced filter 210 is connected, assuming that impedance seen from an A point toward the direction of the balanced filter 210 is Za' and impedance seen from a B point toward the direction of the balanced filter 210 is Zb', impedance between the wiring line 501a and ground becomes parallel impedance of the power line to-ground parasitic capacitance 505 and the impedance Za' and impedance between the wiring line 501b and ground becomes parallel impedance of the power connector line-to-ground parasitic capacitance 506 and the impedance Zb'. As is apparent from FIG. 6, the circuit seen from the A point are equal to the circuit seen from the B point. Accordingly, the impedance Za' and impedance Zb' are equal to each other. As a result, even if a circuit subsequent to the balanced filter 210 is connected, the impedance between the wiring line 501a and ground is equal, and thus a balanced line is maintained.

Figure 7A:
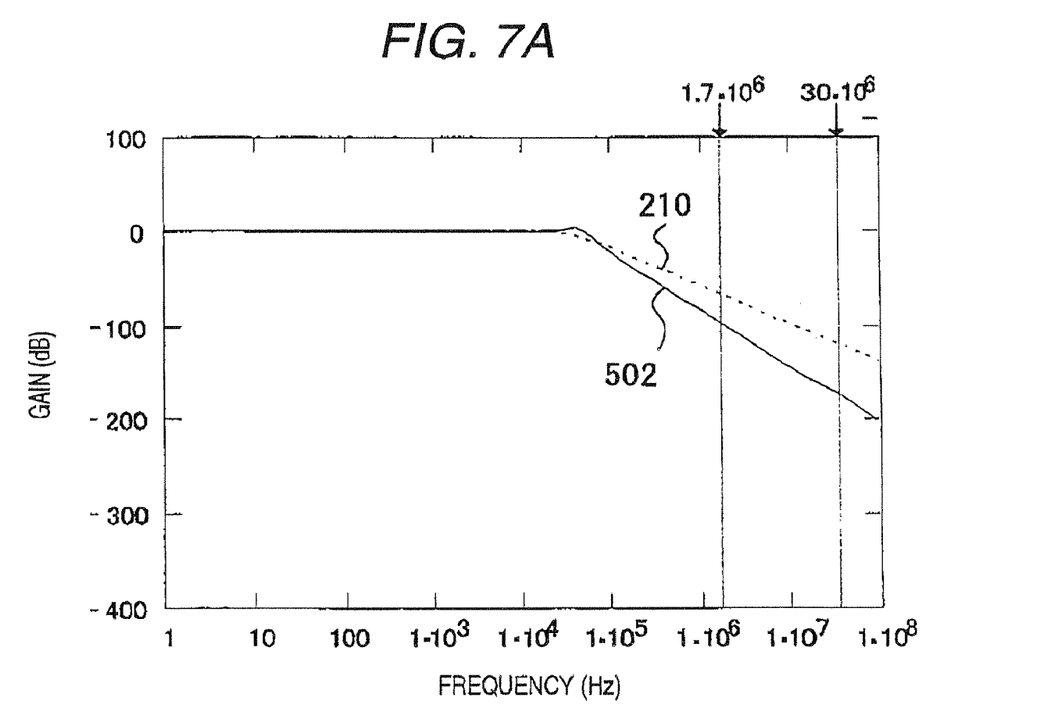
FIG. 7A is a view illustrating gain-frequency characteristic when an unbalanced filter and a balanced filter in the first embodiment are formed by using a constant K filter having characteristic impedance of 100 Ω and a cutoff frequency of 50 KHz.
Figure 7B:
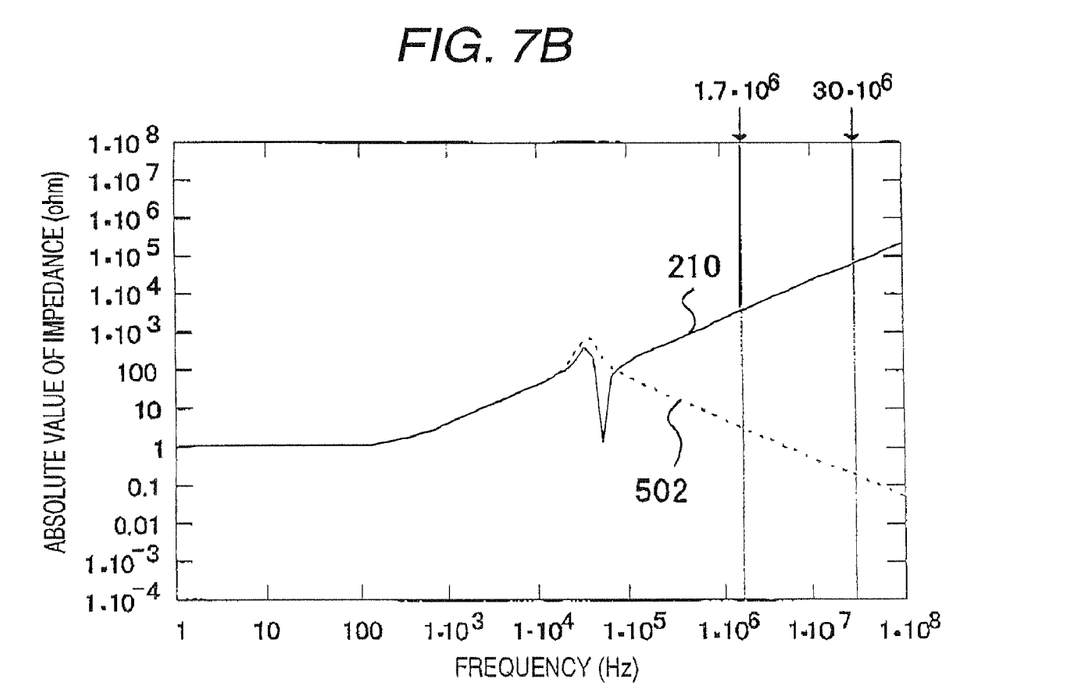
FIG. 7B is a view illustrating impedance-frequency characteristic when an unbalanced filter and a balanced filter in the first embodiment are formed by using a constant K filter having characteristic impedance of 100 Ω and a cutoff frequency of 50 KHz.

Further, in the case when the unbalanced filter 502 and the balanced filter 210 are formed by using the constant K filter having characteristic impedance of 100 Ω and a cutoff frequency of 50 KHz, for example, a gain-frequency characteristic view is shown in FIG. 7A and an impedance-frequency characteristic view is shown in FIG. 7B. In the impedance-frequency characteristic view, it is assumed that a load of 1 Ω is connected considering that a power apparatus (not shown) is connected. As is apparent from FIG. 7B, in both the balanced filter 210 and the unbalanced filter 502, power is transmitted with low loss in a commercial power frequency band bat the loss increases in a shortwave band such that, for example, noises that affect communication can be electively excluded. However, as shown in FIG. 7B, referring to the impedance characteristic within the shortwave band, the filter 502 becomes low impedance to serve as a large load of a power line communication modem, while the filter 210 can be considered as a very small load so as not to affect communication performance. This is advantageous in that the communication performance does not deteriorate, for example, when various apparatuses are connected to the connectors 101 to 104.

Figure 8A:
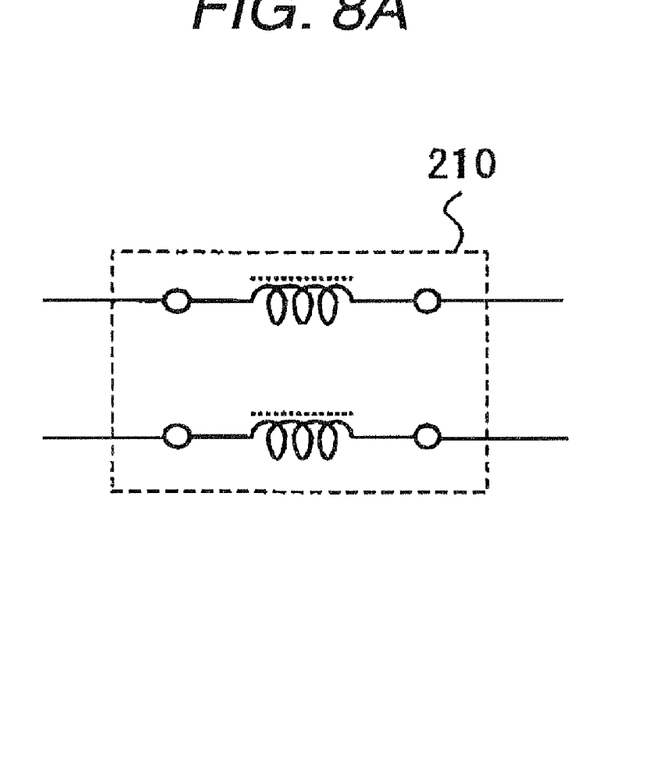
FIG. 8A is a circuit diagram in a case when two inductors are used as a filter in the first embodiment.
Figure 8B:
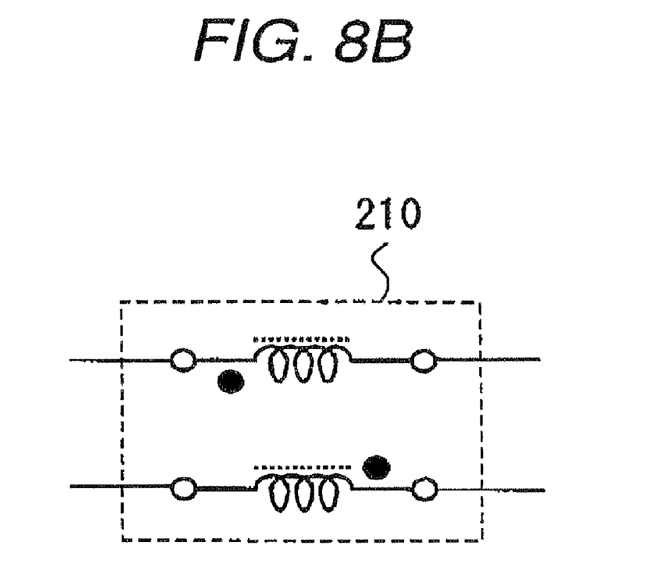
FIG. 8B is a circuit diagram in a case when two inductors are magnetically coupled to form a filter in the first embodiment in order to improve impedance.

As an example of the circuit configuration of the filter 210, four inductors and a capacitor are connected as shown in FIG. 2, thereby realizing a low pass filter. However, the filter 210 may be realized in other configurations. For example, the filter 210 may be simply configured to include two inductors, as shown in FIG. 8A. In addition, when devices connected to the connectors 101 to 104 do not consume a large amount of power, as shown in FIG. 8B, it is possible to improve impedance by magnetically coupling the inductors in FIG. 8A. Alternatively, in order to improve balancing of lines, the filter 210 may be formed by combination with a common mode filter (not shown). Further, in the present embodiment, the constant K filter that can be easily designed has been used. However, it may be possible to use the Butterworth filter, the Chebychev filter, the inverse Chebychev filter, or the cascaded chevyshev filter, for example.

Furthermore, in power line communication using a shortwave band, it is requested to suppress unnecessary leakage of electric field in order to prevent interference with respect to other communication apparatuses (for example, a shortwave receiver, an amateur radio transceiver, or a wireless apparatus in aircraft or ship) using a shortwave band. Therefore, although power lines in the vicinity of outlets in home, in which apparatuses are actually connected, in the shortwave band may be considered as almost balanced lines, it is possible to prevent unnecessary leakage of electric field from increasing without significantly lowering balancing of the power lines by using a balanced (symmetrical between approach path and return path) filter in the cable connecting device for power line communication 100 so as to be connected thereto.

Furthermore, by adopting an inductance input type filter as a filter used for the cable connecting device for power line communication 100, the filter serves as high impedance in power line communication using a shortwave band (for example, 2 to 30 MHz or 1.7 to 30 MHz) and a load of the filter becomes small (because reflection is reduced as a current decreases). That is, it is advantageous in that the communication performance does not deteriorate. In addition, without being limited to the shortwave band, that is, in a frequency band of 30 MHz or more, for example, even in a megahertz frequency band of 1.705 to 80 MHz, the same effects can be obtained.

Thus, the cable connecting device for power line communication 100 according to the first embodiment of the invention is configured to include: the first wiring line 231 through which AC power is capable of being supplied; the second wiring line 232 through which AC power is capable of being supplied and which is different from the first wiring line 231; the power plug 120 which is electrically connected to the first wiring line 231 and the second wiring line 232 and whose wiring lines are capable of being supplied with AC power; the Ethernet port 110 through which a communication signal is capable of being input and output; the power line communication modem 220 that is connected to the Ethernet port 110 and that is connected to the second wiring line 232 through which a communication signal is transmitted by using AC power input to the power plug 120 through the first wiring line 231 between the power plug 120 and the Ethernet port 110; the filter 210 disposed on the first wiring line 231 and having high impedance in at least a communication frequency band rather than a power frequency; and the connectors 101 to 104 which are electrically connected to the first wiring line 231 between the filter 210 and the power line communication modem 220 and to which AC power from the first wiring line 231 is capable of being supplied. The first wiring line 231 is connected to the power circuit 221 (refer to FIG. 2) that supplies power required for operation of the power line communication modem 220. Similar to power supplies of apparatuses connected to the connectors 101 to 104, even in the power circuit 221 of the power line communication modem 220, an adverse effect is prevented in the filter 210 even if reduction of impedance or noise that affects communication occurs.

Thus, the power circuit 221 and the connectors 101 to 104 are connected to the power plug 120 through the single filter 210, since the filter 210 can suppress noises occurring in the power circuit 221 and prevent communication signals from being input to electrical equipment (for example, a battery charger) connected to the connectors 101 to 104. Accordingly, since it is not necessary to separately prepare a filter for a power circuit and a filter for electrical equipment connected to the connectors 101 to 104, a filter can be efficiently used. As a result, duplication of filters can be prevented. Moreover, the filter can be used as impedance for the electrical equipment connected to the connectors 101 to 104.

Second Embodiment

Next, in a second embodiment, it will be described about a cable connecting device for power line communication having a selection switch capable of switching a function corresponding to an apparatus that is connected, assuming a case of connecting a power line communication apparatus to a connector and a case of connected a non-power line communication apparatus to a connector.

First, the second embodiment will be schematically described with reference to FIG. 1. Here, only points different from those in the first embodiment will be described. Connectors 101 to 104 in FIG. 1 cause power to be supplied to a non-power line communication apparatus, power to be supplied to a power line communication apparatus, and a communication signal to be input and output. In addition, a selection switch 130 is a unit that selects whether to reduce a signal, which does not belong to a power frequency band, occurring due to an apparatus connected to the connector 101, that is, a unit that selects whether to cause the signal not belonging to a power frequency band to pass through the filter 210.

Figure 3:
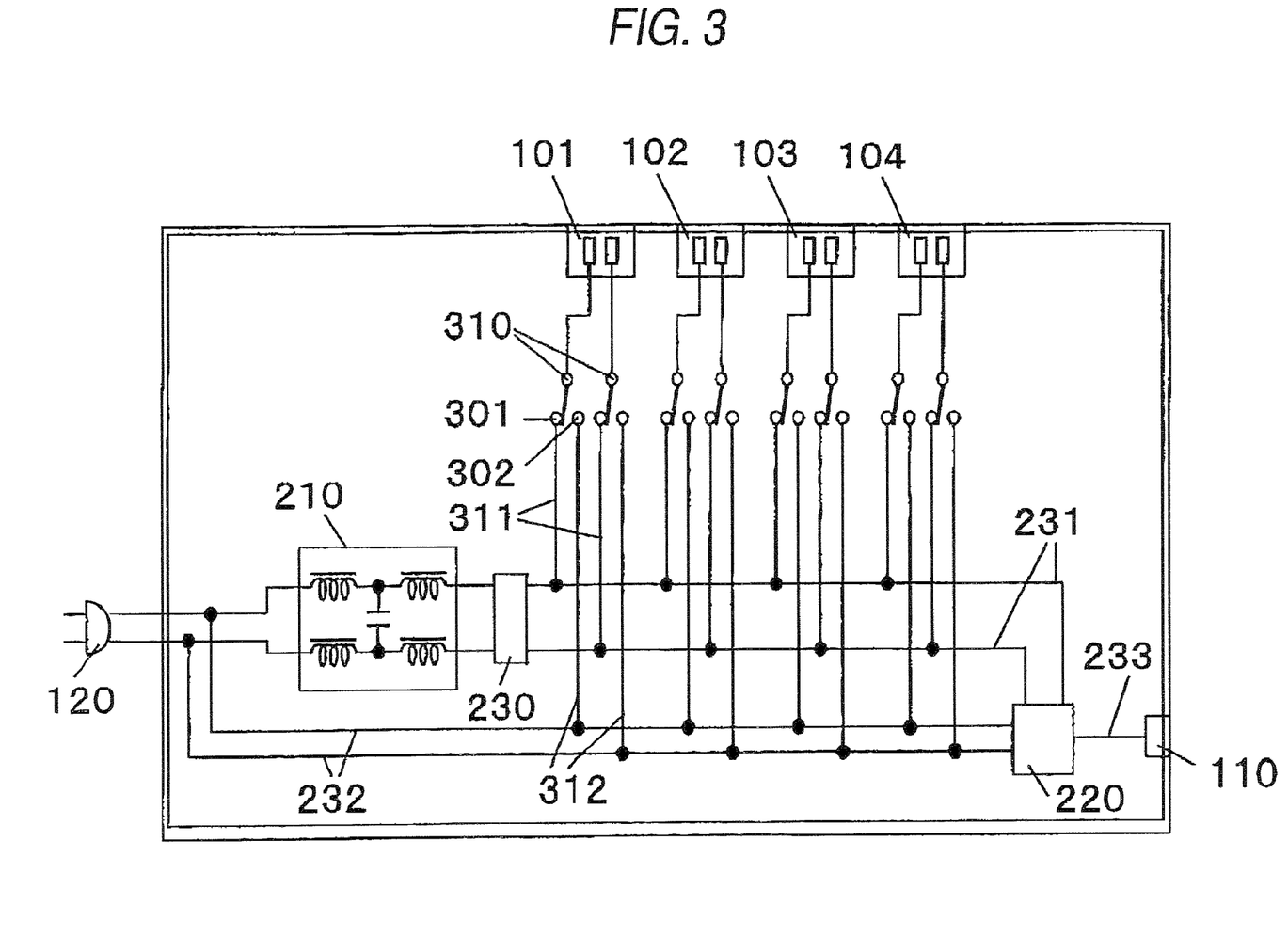
FIG. 3 is a circuit diagram illustrating a cable connecting device for power line communication in a second embodiment.

As shown in FIG. 3, in a cable connecting device for power line communication 300, the same parts as in the cable connecting device for power line communication 100 shown in FIG. 1 are denoted by the same reference numerals. The characteristics of the parts denoted by the same reference numerals are as described above.

The cable connecting device for power line communication 300 includes a selection switch 310 and a first terminal 301 and a second terminal 302, which are electrically connected to the connector 101 by means of the selection switch 310, in addition to the configuration of the cable connecting device for power line communication 100. Although all reference numerals are not shown the selection switch 310 corresponding to each of a pair of recessed connection terminals is provided in each of the connectors 101 to 104, and a first terminal 301 and a second terminal 302 are prepared for each selection switch 310. That is, in the present embodiment, eight selection switches 310, eight first terminals 301, and eight second terminals 302 are provided. In addition, the selection switch 310 is an example of a selector.

The first terminal 301 is a terminal at which each of the connectors 101 to 104 and the first wiring line 231 are electrically connected to each other by means of a first connector line 311 and which is electrically connected to the selection switch 310 in order to transmit power supplied from the power plug 120 to each of the connectors 101 to 104. A connection point between each of the first connector lines 311 and the first wiring line 231 is provided behind a surge absorber 230 and before a power line communication modem 220 on the first wiring line 231.

Further, the second terminal 302 is a terminal at which each of the connectors 101 to 104 and the second wiring line 232 are electrically connected to each other by means of a second connector line 312 and which performs supply of power from the power plug 120 to each of the connectors 101 to 104 and transmission and reception of a communication signal to each of the connectors 101 to 104. Assuming that a side close to the power plug 120 is a 'front stage' and a side close to the power line communication modem 220 is a 'rear stage' on the second wiring line 232, a connection point between the second connector line 312 and the second wiring line 232 is provided behind a connection point between the first wiring line 231 and the second wiring line 232 and before the power line communication modem 220.

As shown in FIG. 3, the filter 210 is inserted between the connectors 101 to 104 and the power plug 120 when the selection switch 310 is connected to the first terminals 301, while the filter 210 is not inserted between the connectors 101 to 104 and the power plug 120 when the selection switch 310 is connected to the second terminals 302. Since the selection switch 310 operates in conjunction with the selection switch 130 (refer to FIG. 1), the selection switch 310 switches on the basis of switching of the selection switch 130.

When a power line communication apparatus is connected to the cable connecting device for power line communication 300, power supply and input and output of communication signals are realized by connecting the power plug 120 of the power line communication apparatus to the connectors 101 to 104. Since high-frequency signal components are generally used for the communication signals, the selection switch 310 is connected to the second terminal 302 so that the communication signals do not pass through the filter 210.

In addition, when a non-power line communication apparatus is connected to the cable connecting device for power line communication 300, power supply-is realized by connecting an outlet of the non-power line communication apparatus to the connector 101 and input and output of a communication signal is realized by connecting a communication cable, such as a LAN cable, of the non-power line communication apparatus to the Ethernet port 110 In the connectors 101 to 104, high-frequency signals other than electrical signals of commercial power are noises. Accordingly, the selection switch 310 is connected to the first terminal 301 so that the noises are removed while passing through the filter 210.

Thus, in the connectors 101 to 104 of the cable connecting device for power line communication 300 according to the present embodiment of the invention, the filter 210 is inserted on the assumption that a power line communication apparatus as well as a non-power line communication apparatus is connected to the connectors 101 to 104. As a result, the connectors 101 to 104 are very useful because the connectors 101 to 104 can also be used for the power line communication apparatus.

In the second embodiment, the cable connecting device for power line communication 300 is configured to include the selection switch 310, which serves to switch connection between the connectors 101 to 104 and the first wiring line 231 to connection between the connectors 101 to 104 and the second wiring line 232. Therefore, the cable connecting device for power line communication 300 according to the second embodiment may be used for both the power line communication apparatus and the non-power line communication apparatus Moreover, in the first and second embodiments described above, the cable connecting device for power line communication has been illustrated as an example of the power line communication apparatus. However, the invention is not specifically limited to the 'cable connecting device for power line communication'. For example, it is possible to use a modem having an outlet that is a connector different from a communication connector, such as RJ45, and a power connector, such as a plug. In addition, the invention may not necessarily have a communication circuit or may have a configuration in which power supplied from a plug is output to the outside by a power circuit.

The invention is useful as a power line communication apparatus and a connecting device capable of efficiently using a filter.

This application is based upon and claims the benefit of priority of Japanese Patent Application No. 2006-038319 filed on Feb. 15, 2006, the contents of which are incorporated herein by reference in its entirety.

The invention claimed is:

1. A power line communication apparatus that superimposes a signal having a first frequency on power having a second frequency lower than the first frequency, comprising:
   a first connector to which the power is input;
   a communication circuit that superimposes the signal on the power input to the first connector;
   a power supply circuit that supplies the power input to the first connector to the communication circuit;
   a second connector that outputs the power input to the first connector to the outside of the power line communication apparatus; and
   a single filter that has impedance characteristics in which impedance corresponding to the first frequency is higher than impedance corresponding to the second frequency,
   wherein the first connector is connected to the power supply circuit through the single filter, and the first connector is connected to the second connector through the single filter.

2. The power line communication apparatus according to claim 1, wherein the communication circuit is connected to the first connector through a first line and transmits the signal onto the first line,
   the power supply circuit is connected to the first connector through a second line and supplies the power input to the first connector to the communication circuit through the second line,
   the single filter is provided on the second line between the first connector and the power supply circuit, and
   the second connector is provided on the second line between the single filter and the power supply circuit.

3. The power line communication apparatus according to claim 2, further comprising:
   a selector that disconnects the second connector from the second line and connects the second connector to the first line.

4. The power line communication apparatus according to claim 1, further comprising:
   a surge absorber that is provided between the second connector and the single filter so as to absorb surge.

5. The power line communication apparatus according to claim 4, wherein the second line has a connection point to which the second connector is connected, and
   the surge absorber is provided between the single filter and the connection point.

6. The power line communication apparatus according to claim 1, wherein the single filter is connected to the first connector through a line including an approach path and a return path and has passive elements on the approach path and the return path.

7. The power line communication apparatus according to claim 6, wherein the passive elements have substantially the same characteristic values.

8. The power line communication apparatus according to claim 6, wherein the passive elements are inductors.

9. The power line communication apparatus according to claim 8, wherein the passive elements are configured to include only inductors.

10. The power line communication apparatus according to claim 1, wherein the first frequency is in a megahertz band.

11. The power line communication apparatus according to claim 10, wherein the megahertz band is 1.705 MHz to 80 MHz.

12. The power line communication apparatus according to claim 1, wherein the second frequency is 60 Hz.

13. The power line communication apparatus according to claim 1, wherein the first connector is a plug.

14. The power line communication apparatus according to claim 1, wherein the power supply circuit converts AC components of the power to DC components and supplies the converted power to the communication circuit.

15. The power line communication apparatus according to claim 14, wherein the power supply circuit converts the AC components of the power to the DC components by using a switching element.

16. The power line communication apparatus according to claim 1, wherein the second connector is an outlet.

17. The power line communication apparatus according to claim 16, wherein a plurality of the outlets are provided.

18. A connecting device for a power line communication apparatus that superimposes a signal having a first frequency on power having a second frequency lower than the first frequency, comprising:
   a first connector to which the power is input;
   a power supply circuit that supplies the power input to the first connector to a communication circuit that superimposes the signal on the power;
   a second connector that outputs the power input to the first connector to the outside of the power line communication apparatus; and
   a single filter has impedance characteristics in which impedance corresponding to the first frequency is higher than impedance corresponding to the second frequency,
   wherein the first connector is connected to the power supply circuit through the single filter, and the first connector is connected to the second connector through the single filter.

* * * * *